May 4, 1948.　　　E. B. MARSDEN　　　2,441,100

CONVEYING MECHANISM

Filed June 1, 1946

INVENTOR.
ERNEST B. MARSDEN
BY
Otto Moeller
ATTY.

Patented May 4, 1948

2,441,100

UNITED STATES PATENT OFFICE 2,441,100

CONVEYING MECHANISM

Ernest B. Marsden, Erie, Pa., assignor to The Standard Stoker Company, Incorporated, a corporation of Delaware Application June 1, 1946, Serial No. 673,753

5 Claims. (Cl. 198—15)

This invention relates to conveying mechanism and particularly to conveying mechanism embodying a conveyor trough, a conveyor screw disposed in the trough, a gear casing at the rearward end of the trough in which casing is mounted a drive shaft extending forwardly into the trough, and a drive connection between the adjacent ends of the drive shaft and conveyor screw.

An object of the invention is to provide in a conveying mechanism of the type described, an effective seal excluding particles of the material being conveyed or dust and dirt of any nature from the drive connection between the conveyor screw and the drive shaft therefor.

Another object of the invention is to exclude such particles, dust and dirt from the bearing for the drive shaft, and eliminating the possibility of such foreign matter from working its way into the gear casing which houses the drive mechanism for the conveyor.

Conveying mechanism of the type described is frequently used in exposed places, for example in the tender unit of a locomotive stoker, where it is exposed to rain and water from wet coal. It is, therefore, another object of the invention to provide a seal for the drive connection between the drive shaft and conveyor of such conveying mechanism, that effectively excludes water from the drive connection and drive shaft bearing.

Figure 1:
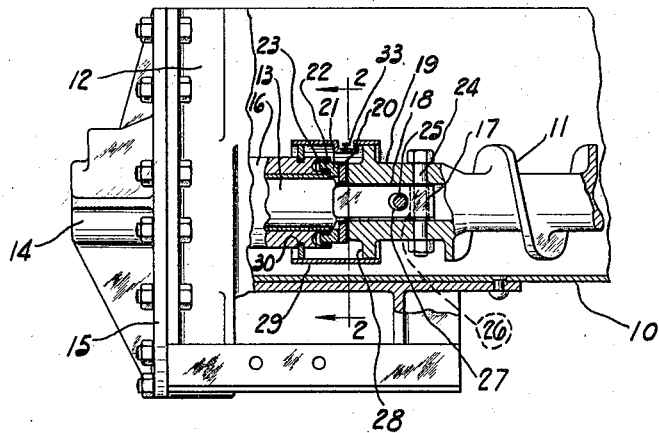
Figure 2:
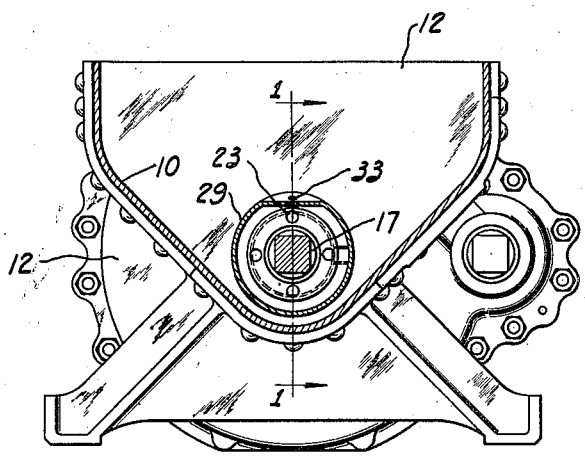
Figure 3:
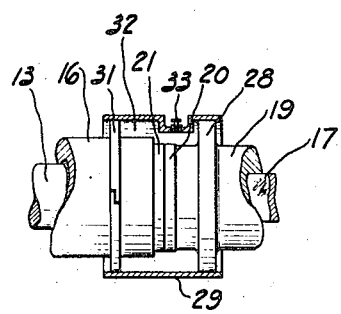

With these and other objects in view, the invention consists of the features of construction, combination and arrangement of parts, hereinafter fully described and claimed, reference being had to the accompanying drawings, in which Figure 1 is a longitudinal central vertical sectional view through the rearward portion of a conveyor trough embodying the novel sealing means for the drive connection between the drive shaft and conveyor screw, with the gear casing for the trough, and other parts being shown in elevation, the section being taken on the line 1—1 of Figure 2;

Figure 2 is a sectional view taken on the line 2—2 of Figure 1 looking in the direction of the arrows; and Figure 3 is an enlarged fragmentary view of the drive connection and sealing means shown in Figure 1, parts being in elevation and parts in section.

Referring to the drawings, the numeral 10 indicates an open mouth conveyor trough in which there is mounted the conveyor screw 11. A gear casing 12 at the rear of conveyor trough 10 houses suitable reduction gearing (not shown) and the rearward end of the drive shaft 13, for operating the conveyor screw 11.

The rear journal of the drive shaft 13 is mounted in a bearing 14 formed with the cover 15 of the gear casing 12 and the front journal of drive shaft 13 is mounted in the annular shaped bearing 16 which is preferably formed integral with the gear casing 12 and extends inwardly of the trough 10. A polygonal forward portion 17 of drive shaft 13 enters a corresponding socket 18 in the hub 19 of conveyor screw 11 forming a drive connection between the drive shaft 13 and conveyor screw 11.

Rearward thrust of the conveyor screw 11 incident to its conveyance of material forwardly in the trough 10, as for example in the conveyance of coal in the tender trough of a locomotive stoker, is transmitted through the bearing 16 to the gear casing 12 by the thrust washers 20 and 21, which are preferably made of manganese steel. Thrust washer 20 is mounted on the polygonal portion 17 of drive shaft 13 adjacent the rearward end of the hub 19 of conveyor screw 11 and is arranged for rotation with the drive shaft 13. Thrust washer 21 is provided with a plurality of lugs 22 arranged to be received in corresponding holes 23 in the forward end face of the bearing 16 and is thus held from rotating.

To prevent the conveyor screw 11 and the drive shaft 13 from pulling apart due to forward thrust of the conveyor screw 11 when operated in reverse, a pair of bolts 24 and 25 arranged at right angles to one another extend through the conveyor screw hub 19 and the polygonal shaft portion 17. The holes in the polygonal shaft portion 17 through which the bolts 24 and 25 extend, are longitudinally elongated as shown at 26 and 27 in Figure 1. As wear between the washers 20 and 21 occurs, the elongated holes 26 and 27 permit the conveyor screw 11 to move rearwardly a corresponding distance, thereby preventing the rearward thrust of the conveyor screw from being transmitted to the drive shaft 13.

The conveyor screw hub 19 is provided near its rearward end with an annular laterally projecting flange 28 to which is suitably secured, a rearwardly extending cylindrical housing 29 which embraces the adjacent ends of the bearing 16 and conveyor screw hub 19, and the thrust washers 20, 21 disposed therebetween. The bearing 16 is provided near its forward end with a peripheral annular groove 30 arranged to receive a split ring 31, the periphery of the ring 31 fitting tightly against the inside surface of the cylindrical housing 29 forming a seal between the open rearward end of the housing 29 and the bearing 16.

The chamber 32 formed by the housing 29 is preferably filled with a heavy lubricant or grease through the fitting 33 to provide a more effective seal and at the same time to provide for lubrication of the relatively moving enclosed parts. While the construction as shown in the drawing is preferable from a practical standpoint, it will be obvious that the flange 28 and ring 31 can be transposed.

I claim:

1. In a conveying system, a bearing member, a drive shaft journaled in said bearing, a conveyor screw having a hub member, a drive connection between said drive shaft and said conveyor screw hub member, one of said members having a peripheral flange, the other of said members having a peripheral groove, a housing about the adjacent ends of said members, one end of said housing being rigidly secured to said flange to form a seal, and a ring mounted in said groove and contacting the other end of said housing to form a seal, said seals preventing ingress of foreign matter to said bearing and drive connection.

2. In a conveying system, a bearing, a drive shaft journaled in said bearing, a conveyor screw having a hub, a drive connection between said drive shaft and said conveyor screw hub, a peripheral flange on said hub, a peripheral groove in said bearing, a housing about the adjacent ends of said bearing and hub, one end of said housing being rigidly secured to said flange to form a seal, and a ring mounted in said groove and contacting the other end of said housing to form a seal, said seals preventing ingress of foreign matter to said bearing and drive connection.

3. In a conveying system, a conveyor trough, a conveyor screw having a hub, said conveyor screw being disposed in said trough, a gear casing forming the rear of said trough, a drive shaft mounted in said casing and projecting forwardly therethrough into said trough, a bearing for said projecting portion of said drive shaft formed with said gear casing, a drive connection between said drive shaft and said conveyor screw hub, a peripheral flange formed on the hub of said conveyor screw, a peripheral groove in said bearing, a housing about the adjacent ends of said bearing and hub, one end of said housing being rigidly secured to said flange to form a seal, and a ring mounted in said groove and contacting the other end of said housing to form a seal, said seals preventing ingress of foreign matter to said bearing and drive connection.

4. In a conveying system, a bearing, a drive shaft journaled in said bearing, a conveyor screw having a hub, a drive connection between said drive shaft and said conveyor screw hub, means interposed between the adjacent ends of said bearing and said conveyor screw hub for transmitting the thrust of said conveyor screw to said bearing including a pair of thrust washers, one of said washers being arranged to rotate with said drive shaft and screw conveyor and the other of said washers being fixed against rotation, a peripheral flange on said hub, a peripheral groove in said bearing, a housing about the adjacent ends of said bearing and hub, one end of said housing being rigidly secured to said flange to form a seal, and a ring mounted in said groove and contacting the other end of said housing to form a seal, said seals preventing ingress of foreign matter to said thrust washers, bearing and drive connection.

5. In a conveying system, a bearing member, a drive shaft journaled in said bearing, a conveyor screw having a hub member, a drive connection between said drive shaft and said conveyor screw hub member, one of said members having a peripheral flange, a housing about the adjacent ends of said members in spaced relation with respect thereto, one end of said housing being rigidly secured to said flange to form a seal, and annular sealing means within the other end of said housing between the adjacent peripheral surfaces of said end of said housing and the member therein, one of said peripheral surfaces being provided with an annular groove for receiving said annular sealing means, said seals preventing ingress of foreign matter to said bearing and drive connection.

ERNEST B. MARSDEN.

REFERENCES CITED

The following references are of record in the file of this patent:

UNITED STATES PATENTS

| Number | Name | Date |
|---|---|---|
| 1,005,472 | Renneburg | Oct. 10, 1911 |
| 1,962,707 | Carter | June 12, 1934 |